(12) United States Patent
Pham et al.

(10) Patent No.: US 9,996,193 B2
(45) Date of Patent: Jun. 12, 2018

(54) METHODS AND SYSTEMS FOR DISPLAY DEVICE TOUCH PANELS

(71) Applicant: Panasonic Avionics Corporation, Lake Forest, CA (US)

(72) Inventors: Thong Pham, Irvine, CA (US); Kaly Hong, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 18 days.

(21) Appl. No.: 15/249,660

(22) Filed: Aug. 29, 2016

(65) Prior Publication Data

US 2018/0059864 A1 Mar. 1, 2018

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04104* (2013.01)

(58) Field of Classification Search
CPC ...... G06F 3/0418; G06F 3/0412; G06F 3/044; G06F 2203/04104
See application file for complete search history.

(56) References Cited

U.S. PATENT DOCUMENTS

| 9,092,100 | B2 | 7/2015 | Coni et al. | |
|---|---|---|---|---|
| 9,323,093 | B2 | 4/2016 | Ninh et al. | |
| 2008/0179963 | A1* | 7/2008 | Fouquet | H01F 19/08 307/104 |
| 2014/0346887 | A1* | 11/2014 | Bhamidipati | H04B 5/0087 307/104 |
| 2014/0354579 | A1* | 12/2014 | Paskalev | H04B 15/02 345/174 |
| 2015/0069572 | A1* | 3/2015 | Khanolkar | H01F 27/2804 257/531 |
| 2016/0087780 | A1* | 3/2016 | Goswami | H04B 5/0031 370/498 |
| 2016/0231840 | A1* | 8/2016 | Bae | G06F 3/041 |
| 2017/0063155 | A1* | 3/2017 | Nishikawa | H02J 50/90 |
| 2017/0230204 | A1* | 8/2017 | Sivertsen | H04L 25/0276 |

* cited by examiner

*Primary Examiner* — Premal R Patel
(74) *Attorney, Agent, or Firm* — Klein, O'Neill & Singh, LLP (57) ABSTRACT

Methods and systems for a display device having a touch panel are provided. In one aspect, the display device may comprise a sensor glass for sensing a touch and providing a touch input signal; a touch panel controller that includes a touch panel integrated circuit (IC) coupled to the sensor glass and a first low voltage source; and a display assembly that includes an isolator that couples the touch panel IC to the display assembly, with the isolator electrically isolating the touch panel IC from the display assembly. In another aspect, the display device includes a touch panel controller that receives a touch input signal from a sensor glass and provides touch information.

20 Claims, 11 Drawing Sheets

METHODS AND SYSTEMS FOR DISPLAY DEVICE TOUCH PANELS

TECHNICAL FIELD

The present disclosure relates to display devices in general, and more particularly, to touch panels for display devices.

BACKGROUND

Transportation vehicles, for example, aircraft, trains, buses, recreation vehicle, boats and other similar vehicles use various computing devices and systems for providing various functions, including entertainment content. The entertainment content is generally delivered to a consumer using a user interface system that provides a display device (for example, a touch screen), which often includes a touch panel (e.g., a capacitive touch panel) and a display assembly.

Conventional touch panels on display devices suffer from what is referred to as "ghosting" or "ghost touches". A ghost touch is detection of a touch by a touch panel without any input from a user or other input. A ghost touch may be due to electronic noise from equipment or system components operating near the display device or connected thereto. Ghosting is undesirable and there is a desire to reduce such effects in touch panels.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware and/or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Methods and systems for a display device having a touch panel are provided. For example, the display device may comprise a sensor glass configured to sense a touch and provide a touch input signal; a touch panel controller that includes a touch panel integrated circuit (IC) coupled to the sensor glass and a first low voltage source; and a display assembly that includes an isolator configured to couple the touch panel IC to the display assembly, with the isolator electrically isolating the touch panel IC from the display assembly.

Figure 1A:
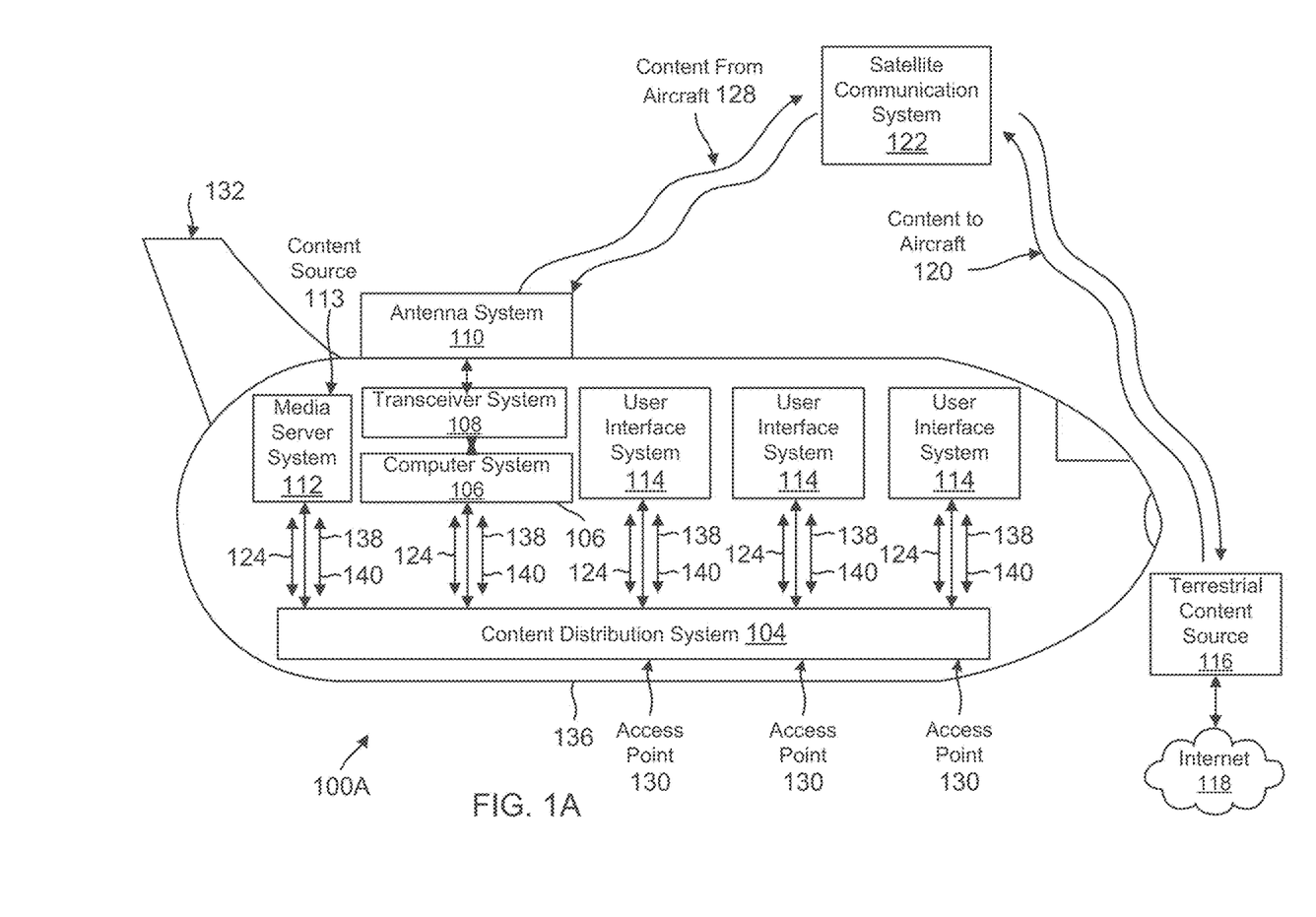
FIG. 1A shows an example of an operating environment for implementing the various aspects of the present disclosure in an aircraft.

Vehicle Information System: FIG. 1A shows an example of a generic vehicle information system 100A (also referred to as system 100A) that can be configured for installation aboard an aircraft 132, according to one aspect of the present disclosure. As an example, system 100A can comprise a conventional aircraft passenger in-flight entertainment (IFE) system, such as the Series 2000, 3000, eFX, eX1, eX2, eX3, eXW, eXO and/or any other in-flight entertainment system developed and provided by Panasonic Avionics Corporation (without derogation of any trademark rights of Panasonic Avionics Corporation) of Lake Forest, Calif.

System 100A may include a content source 113 and one or more user (or passenger) interface systems (may also be referred to as a seatback device) 114 that communicate with a real-time content distribution system 104. The content source 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124. The viewing content 124 may include pre-programmed viewing content and/or any content 120 received via a satellite communication system 122, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD)

system, and/or magnetic media systems, such as a video cassette recorder (VCR) system, a solid state drive (SSD) system, or other forms of non-volatile memory (NVM), or a hard disk drive (HDD) system, of any suitable kind, for storing the preprogrammed content and/or the viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include a public announcement and two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive viewing content 120 from a selected terrestrial content source 116 via satellite communication system 122 and/or transmit content 128 to the satellite communication system 122, including navigation and other control instructions, to the terrestrial content source 116.

As desired, the terrestrial content source 116 can be configured to communicate with other terrestrial content sources (not shown). Although shown and described as comprising the satellite communication system 122 for purposes of illustration, the communication system can comprise any conventional type of wireless communication system, such as a cellular communication system (not shown) and/or other aircraft to off-board communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114, as desired. Although shown and described as being separate systems for purposes of illustration, the computer system 106 and the media server system 112 can be at least partially or fully integrated.

The user interface system 114 may be computing terminals in communication with an access point 130. The user interface system 114 provides a display device, for example, a smart monitor with a touch panel, to view content. The user interface system 114 includes a hardware interface to connect to an access point 130 that provides a wired and/or a wireless connection for the user interface system. In at least one aspect, the user interface system (also referred to as a seatback device) 114 comprises a software application that a user downloads and installs on a personal user device carried aboard by a user (a personal electronic device or "PED") to receive and view content via an access point 130.

While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system, for example, a touch panel, for permitting the user (or passenger) to communicate with system 100A, such as via an exchange of control signals 138. Details regarding touch panels are provided below. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, for a Wi-Fi session, ordering food/beverages, shopping or for any other reason, payment information can be obtained using a camera of a seat device, described below in detail.

In one aspect, the user interface system 114 is provided at individual passenger seats of aircraft 132. The user interface system 114 can be adapted to different aircrafts and seating arrangements.

Figure 1B:
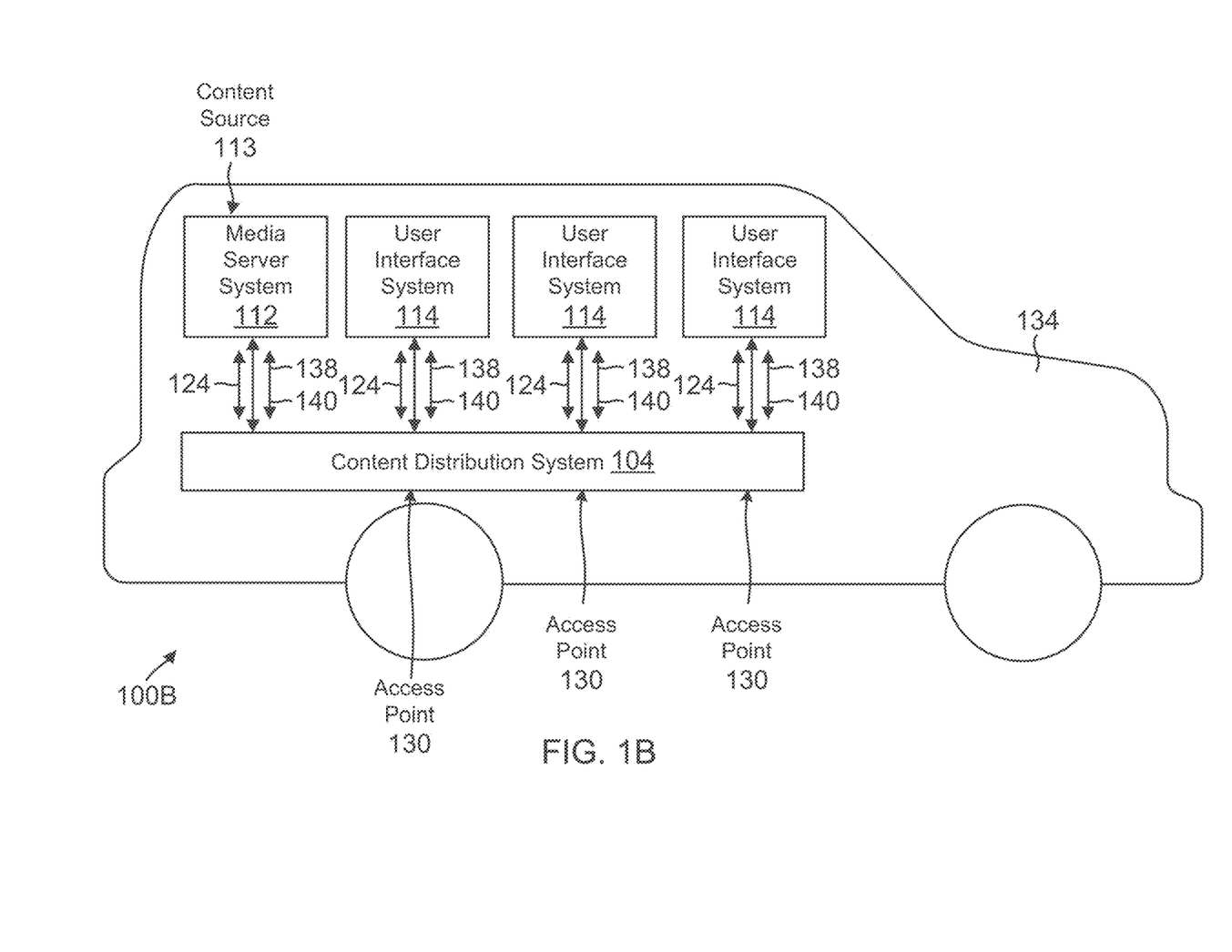
FIG. 1B shows an example of the operating environment on another transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 1C:
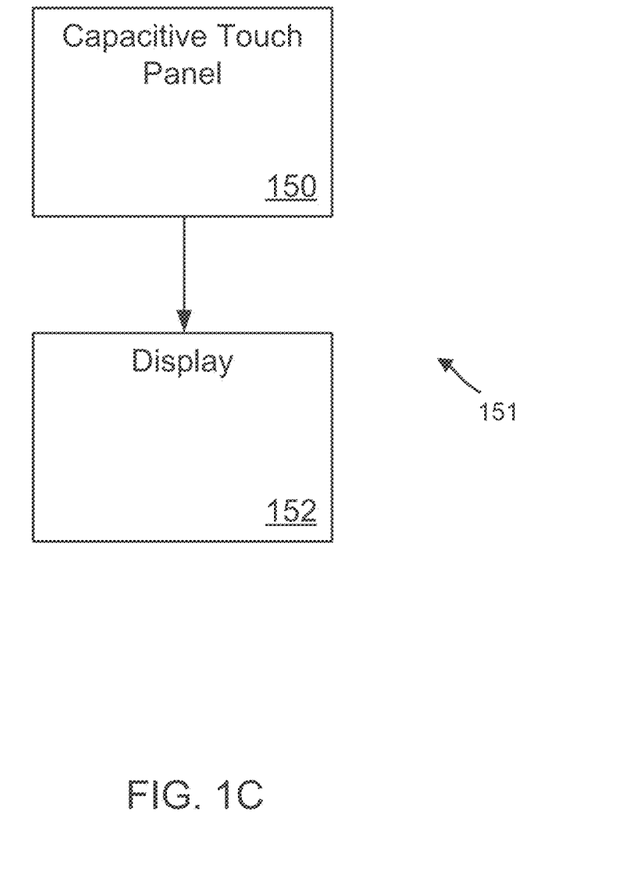
FIG. 1C shows a block diagram assembly of a display device with a touch panel.

FIG. 1C shows a block diagram of a display device 151 with a touch panel 150, in accordance with aspects of the disclosure. In some aspects, the display device 151 is a part of or disposed within a user interface system such as the user interface system 114 of FIGS. 1A and 1B.

As illustrated in FIG. 1C, the display device 151 includes a capacitive touch panel (CTP) 150 coupled to a display 152. The CTP 150, for example, may be layered on top of the display 152. The display 152, for example, may be configured to present content such as the viewing content 124 and/or the illustrative user instructions 140 as discussed above. In some aspects, the display 152 is an electronic visual display such as a liquid crystal display (LCD), inorganic or organic light emitting diode (LED, OLED), cathode ray tube (CRT), field emission display (FED), vacuum fluorescent display (VFD), surface-conduction electron-emitter display (SED), or a plasma display. In modern systems the display 152 is typically an LCD, LED, or OLED.

The CTP 150 serves to enable interaction between a user and content displayed on the display 152. The user, for example, may provide input to an input system (not shown) for communicating with system 100A through simple or multi-touch gestures by touching the CTP 150 with one or more fingers, stylus, and/or other objects. In some aspects, the CTP 150 may include projected capacitive touch (PCT) technology having mutual capacitive and/or self-capacitive sensors.

Figure 2:
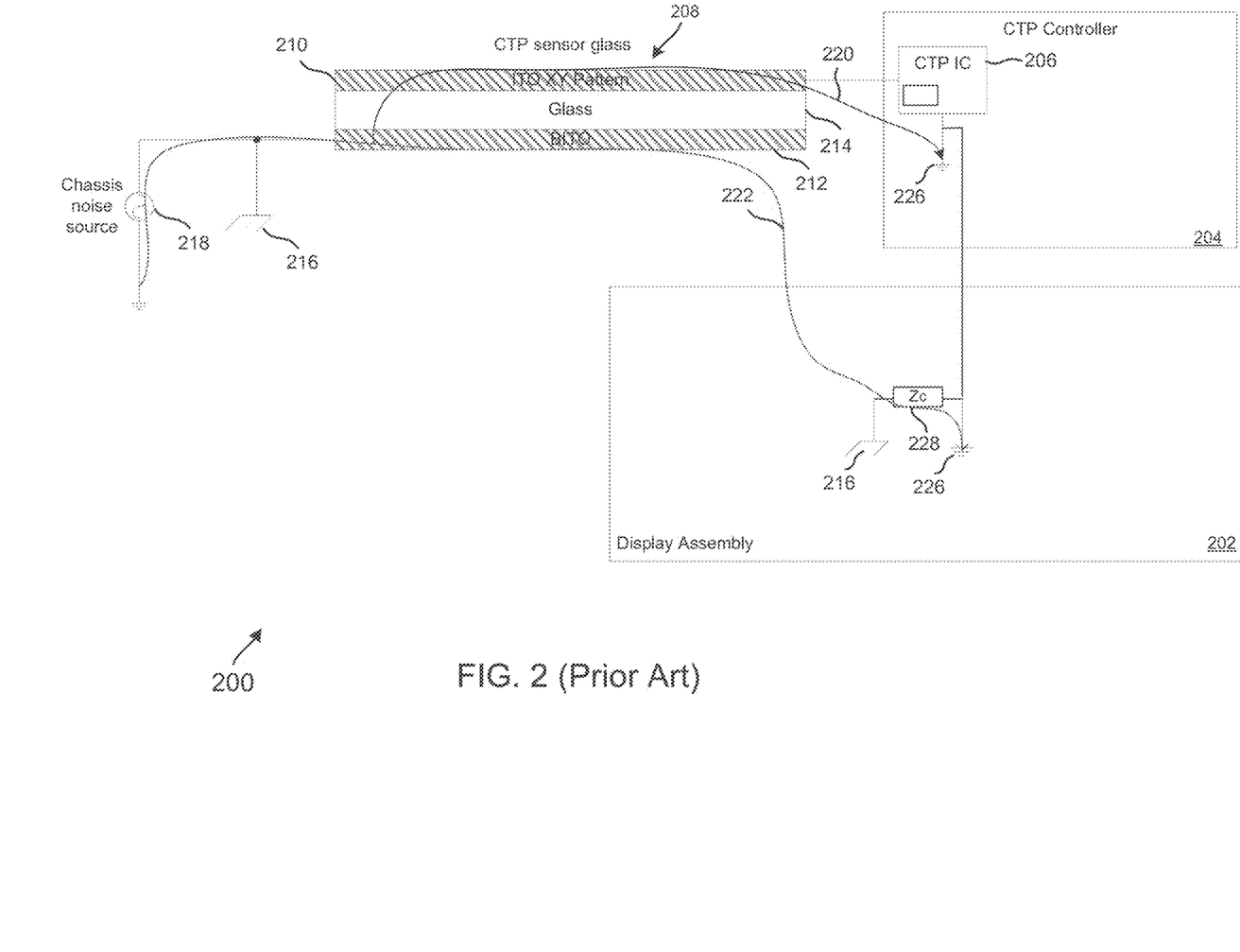
FIG. 2 shows an example of a conventional system for display device.

FIG. 2 shows an example of a conventional display device. In FIG. 2, a display device 200 includes a sensor glass 208 (e.g., CTP sensor glass), a touch panel controller 204 (e.g., CTP controller), and a display assembly 202. In some aspects, the sensor glass 208 and the touch panel controller 204 together form a CTP subsystem of the display device 200 a touch panel such as a CTP. The sensor glass 208 comprises a glass substrate 214 disposed between a first conductive layer 210 and a second conductive layer 212. (There other unillustrated substrate layers above and below the first conductive layer 210, which are not shown for brevity and clarity of explanation as they are not relevant to the disclosure). For example, by way of etching, the first conductive layer 210 may be disposed on a top surface of the glass substrate 214 to form an X-Y grid pattern of electrodes. Similarly, the second conductive layer 212 may be disposed underneath a bottom surface of the glass substrate 214 to form a conductive coating layer that is bonded to the display device chassis. The second conductive layer 212 mitigates EMI emissions. Accordingly, the first conductive layer 210 and second conductive layer 212 may form a capacitive element within the sensor glass 208.

The X-Y grid pattern of electrodes may serve as capacitors thereby forming capacitive touch sensors (e.g., mutual capacitive and/or self-capacitive sensors) for sensing or detecting input (e.g., a physical touch) at a location on the sensor glass 208. In some aspects, the first conductive layer 210 and second conductive layer 212 may include optoelectronic material such as indium tin oxide (ITO). Accordingly, as shown in FIG. 2, the first conductive layer 210 may be referred to as an "ITO XY Pattern" and the second conductive layer 212 may be referred to as a "back ITO (BITO)."

The touch panel controller 204 receives a touch input signal from the sensor glass 208 and translates the touch input signal into touch data (e.g., information identifying the touch location) that for a computer or embedded system controller, such as the input system as previously discussed. In doing so, the touch panel controller 204 may include a touch panel integrated circuit (IC) 206 coupled to the first conductive layer 210 and a first low voltage source 226 (e.g., signal or digital ground) for processing and translating the touch input signal generated by the sensor glass 208. In some aspects, the touch panel IC 206 may comprise one or more processors or microcontrollers for performing such tasks. In some aspects, the touch panel IC 206 may have a scanning frequency of between 80 KHz to 250 KHz, but not limited thereto.

The display assembly 202 may comprise a display (e.g., the display 152 of FIG. 1C) and a display controller (not shown), with the display controller coupled to the display. The display controller is configured to control the display for displaying video information. As an example, the display controller may scale and/or format display or video signals so as to drive the display within the display assembly 202. The video signals may include video information, signal type, resolution, signal standard, aspect ratio, signal timing, and/or connector type. In some aspects, the display controller may include one or more processors or microcontrollers configured by software or program instructions for controlling the display.

In some aspects, the display assembly 202 (e.g., the display and/or display controller) may include onboard capacitors, for example electrostatic discharge (ESD) capacitors, coupled between a chassis ground 216 and the first low voltage source 226. The onboard capacitors may have an impedance 228, which may be referred to as Zc. In some aspects, Zc may be relatively high at the CTP scanning frequency.

As further shown in FIG. 2, the second conductive layer 212 is coupled to the chassis ground 216 and also to a chassis noise source 218, with the chassis noise source 218 also coupled to the first low voltage source 226. Ground noise from the chassis noise source 218, for example, may be generated or induced from various equipment within the aircraft 132 (as shown in FIG. 1A) or the automobile 134 (as shown in FIG. 1B) having a common ground loop such as the media server system 112, computer system 106, transceiver system 108, one or more user interface systems 114, and/or content distribution system 104.

In operation, the ground noise from the chassis noise source 218 may travel through a noise path 220 that extends through the sensor glass 208, touch panel IC 206, and first low voltage source 226. For example, as the first conductive layer 210 and second conductive layer 212 act as a capacitive element within the sensor glass 208, noise from the chassis noise source 218 may be transmitted through the capacitive element to the touch panel IC 206, with some ground noise being shunted to the first low voltage source 226 through the onboard capacitors (as indicated by a path 222). As the ground noise travels through the sensor glass 208 and touch panel IC 206, ghost touches or misplaced location sensing may occur thereby causing the touch panel IC 206 to process inaccurate input touch information. Generally, the touch panel IC 206 is susceptible to any chassis noise having a frequency around the scanning frequency of the touch panel IC 206.

Figure 3A:
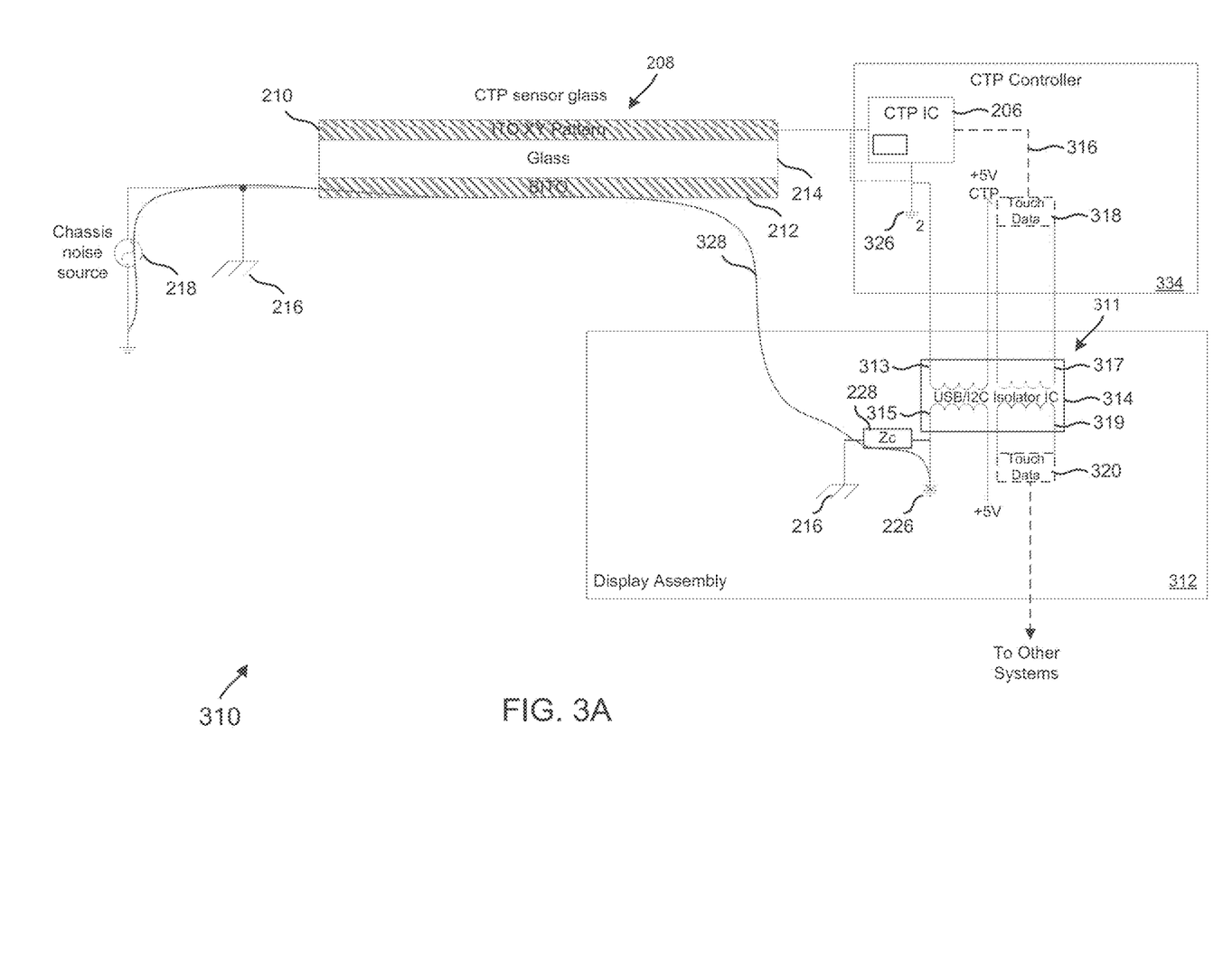
FIGS. 3A-C show examples of display device systems, according to various aspects of the disclosure.
Figure 3B:
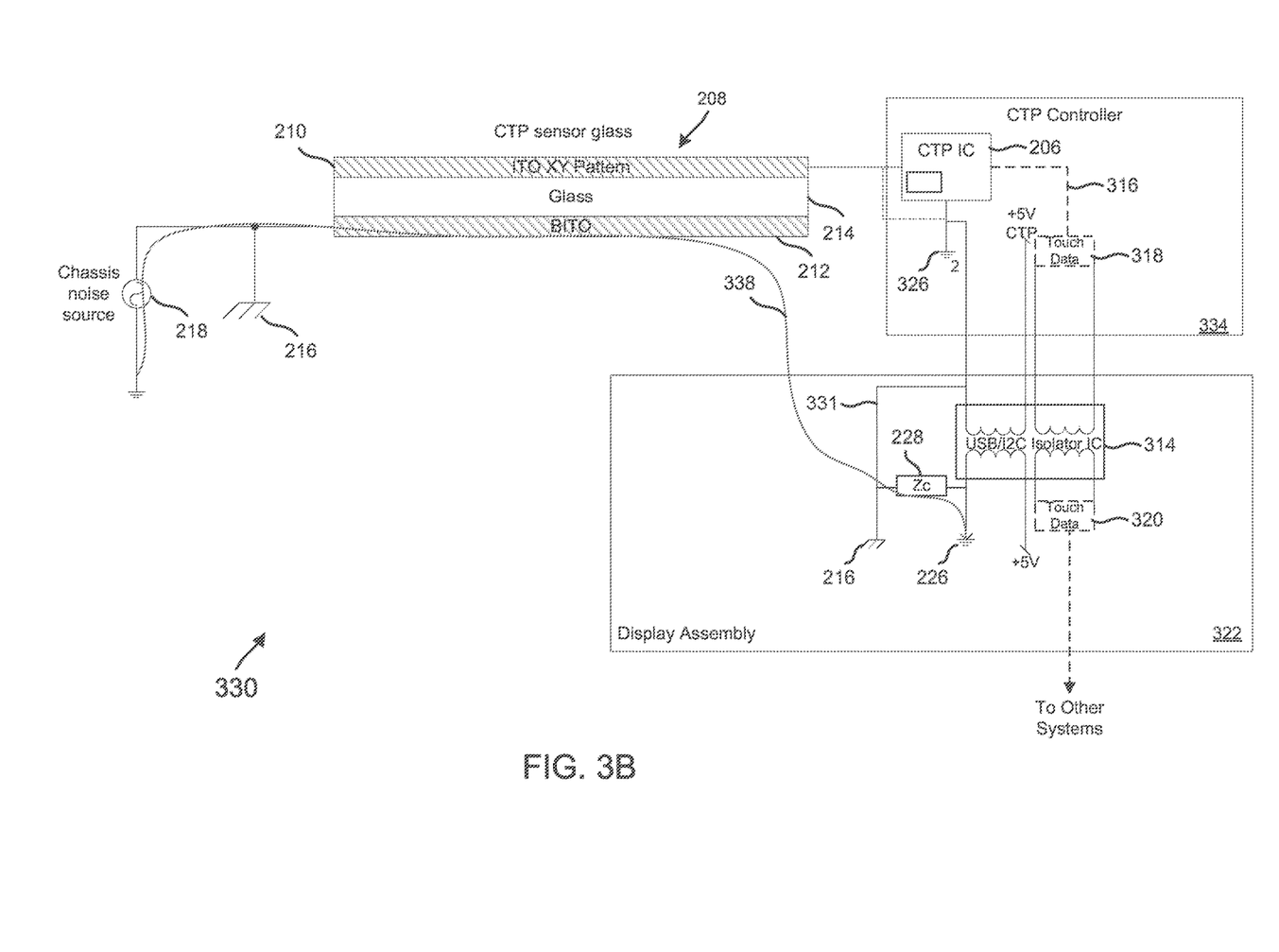
Figure 3C:
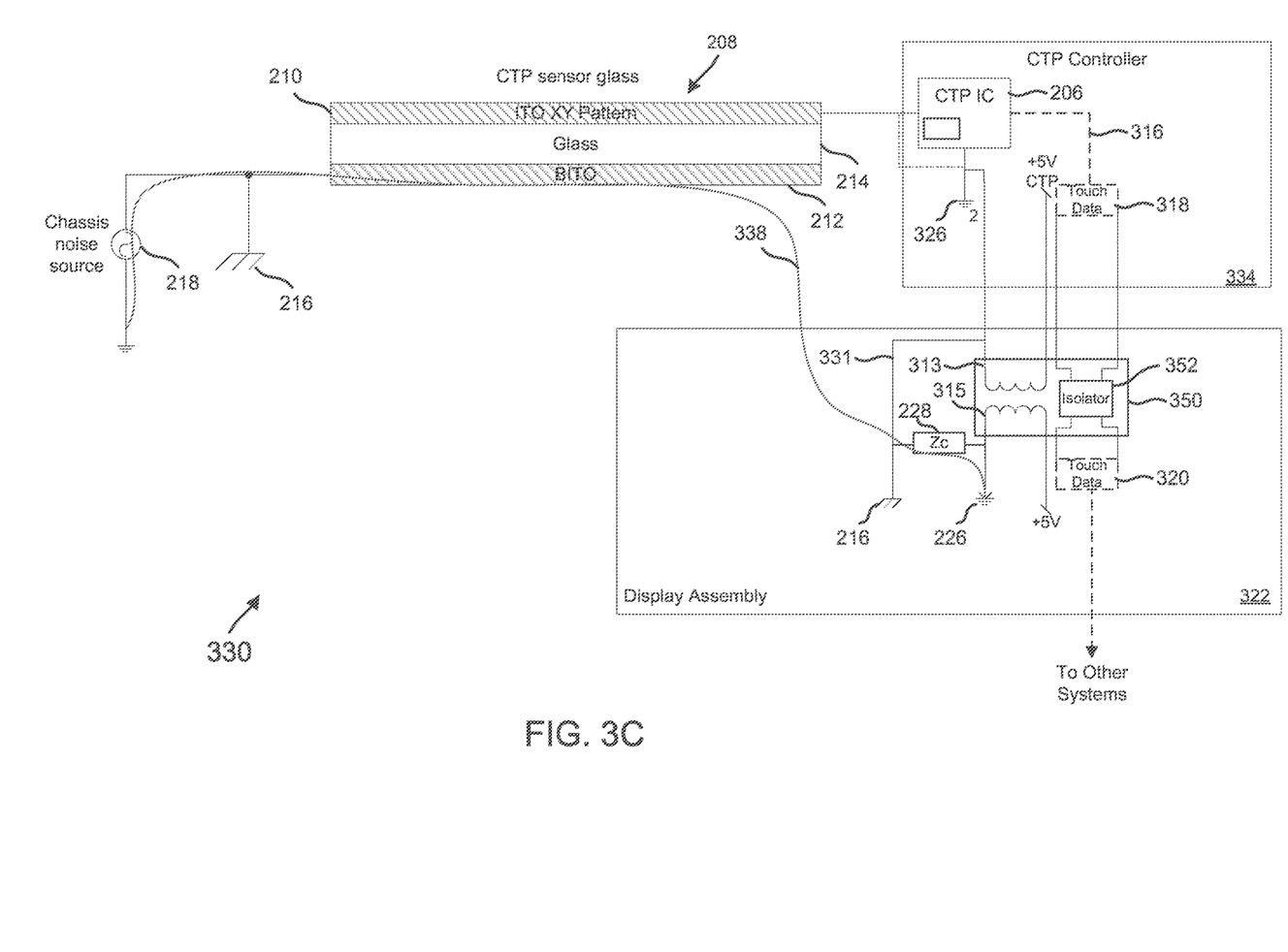

This problem may be reduced or mitigated in the various aspects of the present disclosure, as shown in FIGS. 3A-3C. FIG. 3A illustrates a display device 300 that includes some components similar to the display device 200 discussed above with respect to FIG. 2, and for brevity sake, those components are not discussed again.

In particular, FIG. 3A illustrates an example of a display device in accordance with the various aspects of the present disclosure. As illustrated in FIG. 3A, a display device 310 includes aspects that are similar to or same as the aspects of the display device 200 discussed above with respect to FIG. 2. In FIG. 3A, the touch panel IC 206 is coupled to the first conductive layer 210 and a second low voltage source 326 (e.g., a second signal ground). As shown in FIG. 3A, a touch panel controller 334 (which may be similar to or same as the touch panel controller 204 as previously discussed) is coupled to a display assembly 312 (which may be similar to or same as the display assembly 202 as previously discussed) by way of an isolator 314 disposed within the display assembly 312 (e.g., on a display or display controller). While illustrated as within the display assembly 314, the isolator may alternatively be provided within the CTP controller 334. The isolator 314 provides galvanic isolation between the CTP subsystem and the display assembly 312. Galvanic isolation may be achieved either inductively, optically, or digitally. The isolator 314 (e.g., USB, power, or I2C isolator) may include a first coil 313 and a second coil 315 that inductively convey or transfer power to each other, with an isolation barrier forming between the first coil 313 and the second coil 315. The isolator 314 may further include a third coil 317 that inductively transmits information to and receives information from a fourth coil 319, with the isolation barrier also forming between the third coil 317 and the fourth coil 319.

As further shown in FIG. 3A, the first coil 313 includes a first end connected to a first high voltage source (e.g., +5V) and a second end connected to the second low voltage source 326. The second coil 315 includes a first end connected to a second high voltage source (e.g., +5V) and a second end connected to the first low voltage source 226. The third coil 317 includes a first end and a second end coupled to the touch panel IC 206, with the touch panel IC 206 communicating touch data or information 318 (e.g., location information of the touch) to the third coil 317 via one or more signal paths 316, for example wire traces on a printed circuit board (PCB). The fourth coil 319 includes a first end and a second end coupled to a computer or embedded system controller for communicating touch data 320 (e.g., location information of the touch) to the computer or embedded system controller. Accordingly, in FIG. 3B, the touch panel controller 334 is galvanically isolated from the display assembly 312.

In various aspects, as the touch panel controller 334 is connected to a different low voltage source from the display assembly 312 and/or the chassis noise source 218, some ground noise may be shunted to the first low voltage source 226 (as indicated by a noise path 328) while there is no path for the ground noise to couple into the touch panel controller IC 206. This, therefore in theory would remove ground noise interference and eliminate ghost touches within the touch panel controller 334. In some aspects, the touch data 318 and touch data 320 may include the same touch information. In some aspects, the touch data 318 may include encoded location information of the touch and the touch data 320 may include decoded location information of the touch.

FIG. 3B illustrates another example of a display device in accordance with the various aspects of the present disclosure. As illustrated in FIG. 3B, a display device 330 includes aspects that are similar to or same as the aspects of the display device 310 discussed above with respect to FIG. 3A, and for brevity sake, are not discussed again.

In FIG. 3B, the second low voltage source 326 (e.g., the isolated signal ground) is connected to the chassis ground 216 using signal path 331 (e.g., wire trace on a PCB). This, in various aspects, may cause the BITO to become a stable reference for the sensor ITO thereby improving performance within the display device 330.

FIG. 3C illustrates another example of a display device in accordance with the various aspects of the present disclosure. In particular, FIG. 3C illustrates the display device 330 of FIG. 3B modified to include a digital isolator or optoisolator 350, which may be in the display assembly 312 or the CTP controller 334. The digital isolator or optoisolator 350 includes an isolator component 352 coupled to a computer or embedded system controller for communicating touch date 320 to the computer or embedded system controller either digitally or optically. Accordingly, in FIG. 3C, the touch panel controller 334 is galvanically isolated from the display assembly. Digital isolators are commercially available, for example, from Silicon Laboratories of Austin, Tex. Optoisolators, also known as optocouplers, are commercially available for example, from Texas Instruments of Dallas, Tex. USB, power, or I2C isolators are commercially available for example, from Analog Devices of Norwood, Mass. A pair of coils 313 and 315 are included in FIG. 3C for transferring power between the CTP controller 334 and the display assembly 322.

Figure 4:
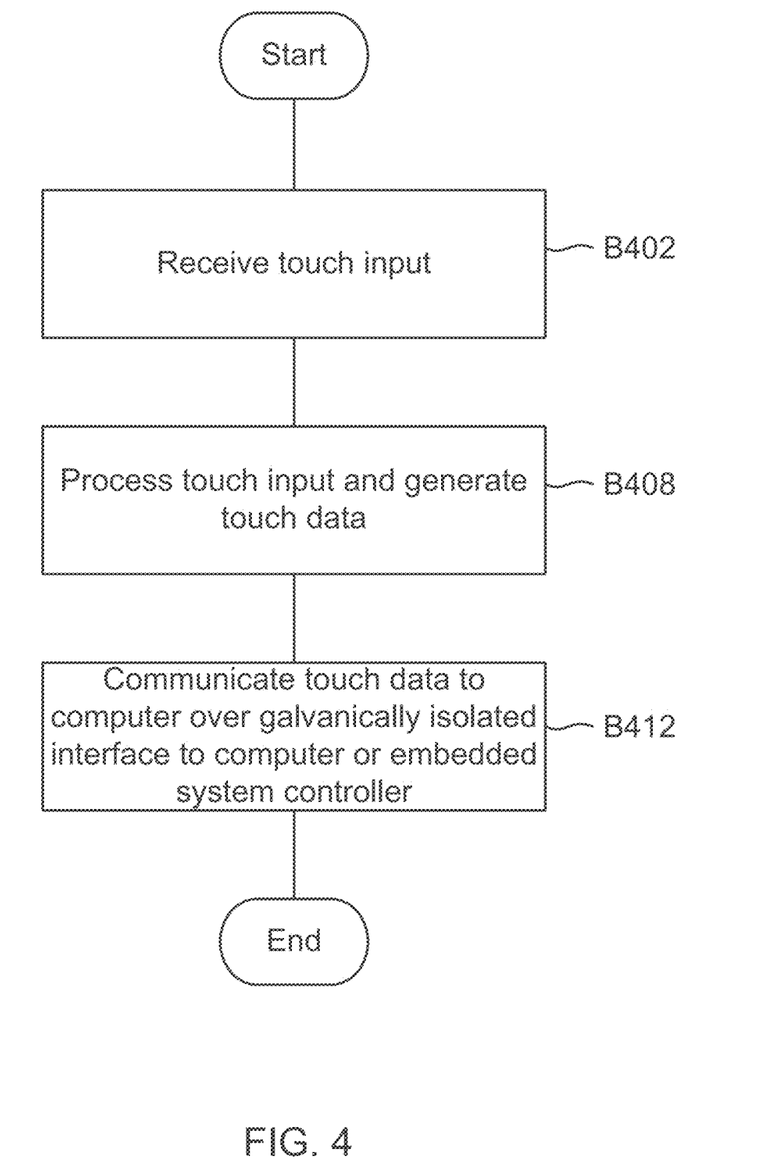
FIG. 4 shows a process flow for using display device systems, according to one aspect of the present disclosure.

FIG. 4 illustrates an exemplary process for eliminating or reducing ghost touch instances from a display device, according to one aspect of the present disclosure. In block 402, touch input is received by the touch panel controller 204. For example, when a person's finger touches the sensor glass 208, electrical charge is transferred to the finger to complete the circuit thereby creating a touch input (e.g., a voltage drop) on a particular point or area of the sensor glass 208 (i.e., a particular point or area on the X-Y grid pattern). The touch input, in turn, is communicated to the touch panel IC 206.

In block 408, the touch input is processed by the touch panel IC 206. As an example, the touch panel IC 206 may include software or program instructions that process the touch input and generate touch data, which may include location information of the touch.

In block 412, the touch data is inductively, digitally, or optically communicated to a computer or embedded system controller. As described above, the touch panel IC 206 is coupled to the display assembly 312 using the isolator 314 disposed within the display assembly 312, with the touch panel IC 206 connecting to a different low voltage source from the display assembly 312 and the chassis noise source 218. In addition, the touch panel IC 206 communicates the touch data 318 over the galvanic isolator 314 to an embedded system controller. Because the CTP controller 334 is electrically isolated from the display assembly 312 using the isolator 314, there is no path through the CTP controller for the ground noise to couple into the touch panel controller IC 206, thereby substantially eliminating instances of ghost touches. The process thereafter returns or ends.

Figure 5:
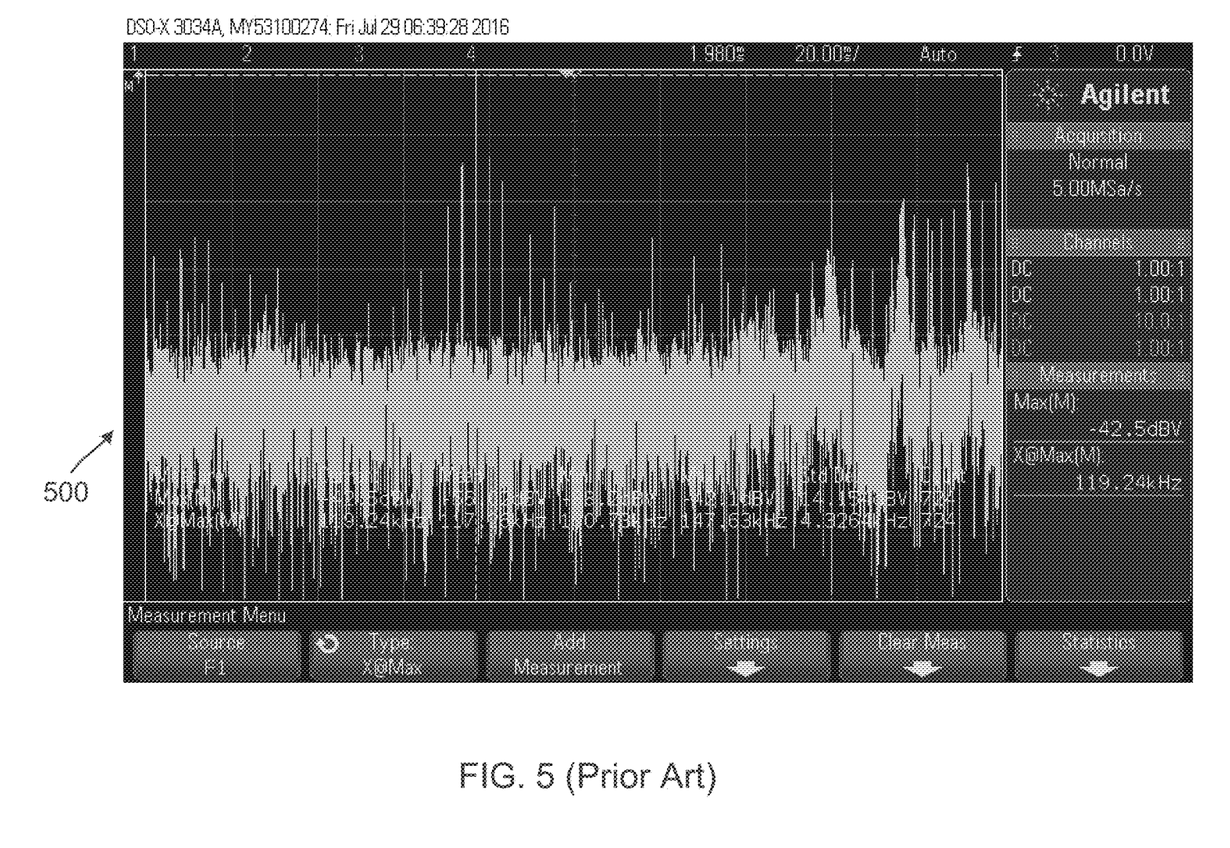
FIG. 5 provides a waveform of chassis noise relative to a signal or digital ground perceived by a conventional display device.

FIG. 5 provides a waveform of chassis noise relative to the signal ground 226 of the CTP controller 204 of FIG. 2. In FIG. 5, a waveform 500 includes a horizontal axis and a vertical axis. The horizontal axis represents the frequency of the chassis noise (which may be measured in KHz) and the vertical axis represents the magnitude of the chassis noise (which may be measured in dBV). As shown in FIG. 5, the waveform 500 includes random fluctuations in magnitude ranging, for example, from −88.2 dBV to −42.1 dBV with a mean of −56.02 dBV.

Figure 6A:
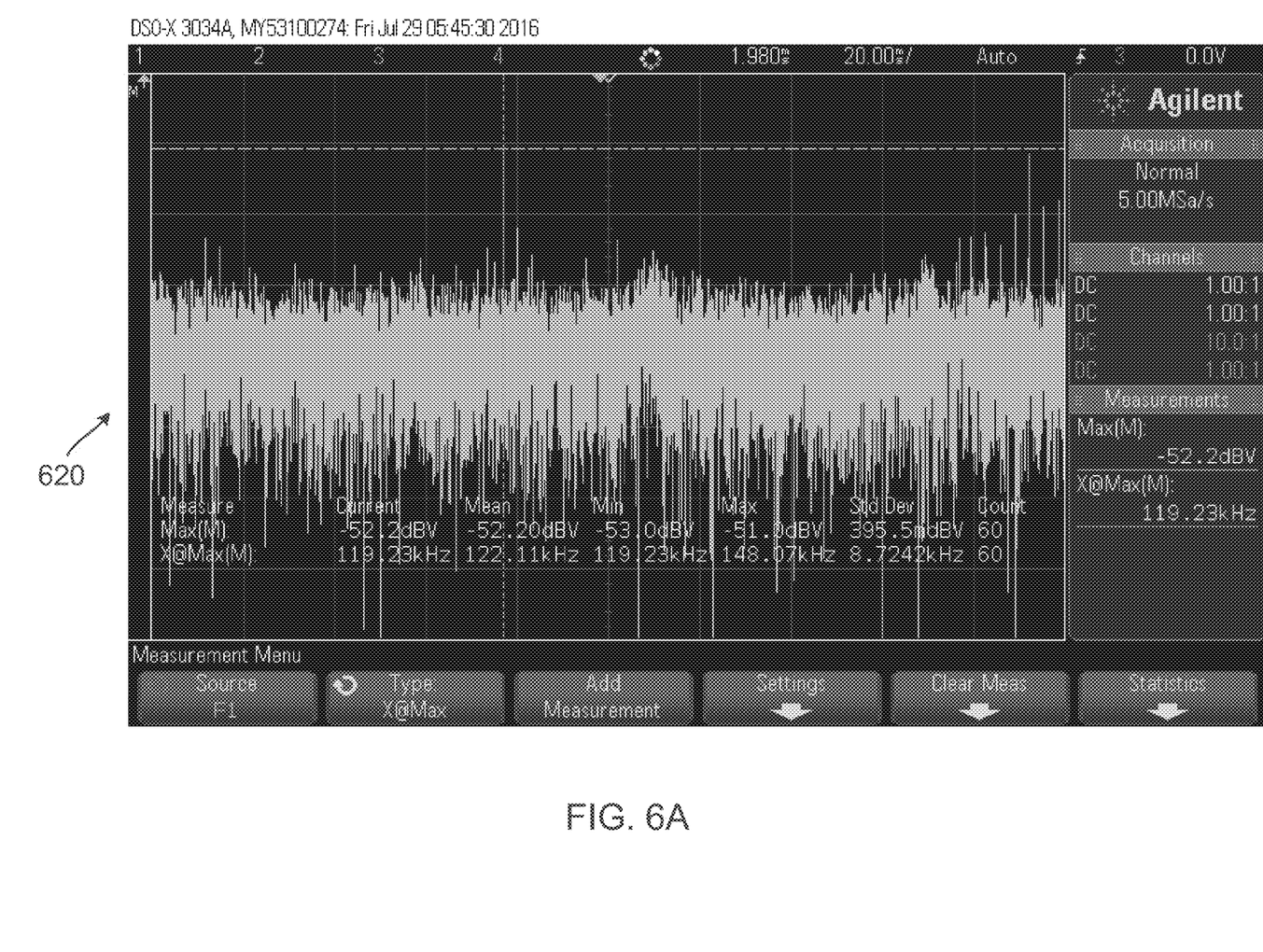
FIGS. 6A and 6B provide waveforms of chassis noise relative to a signal ground perceived by display systems, according to various aspects of the present disclosure.
Figure 6B:
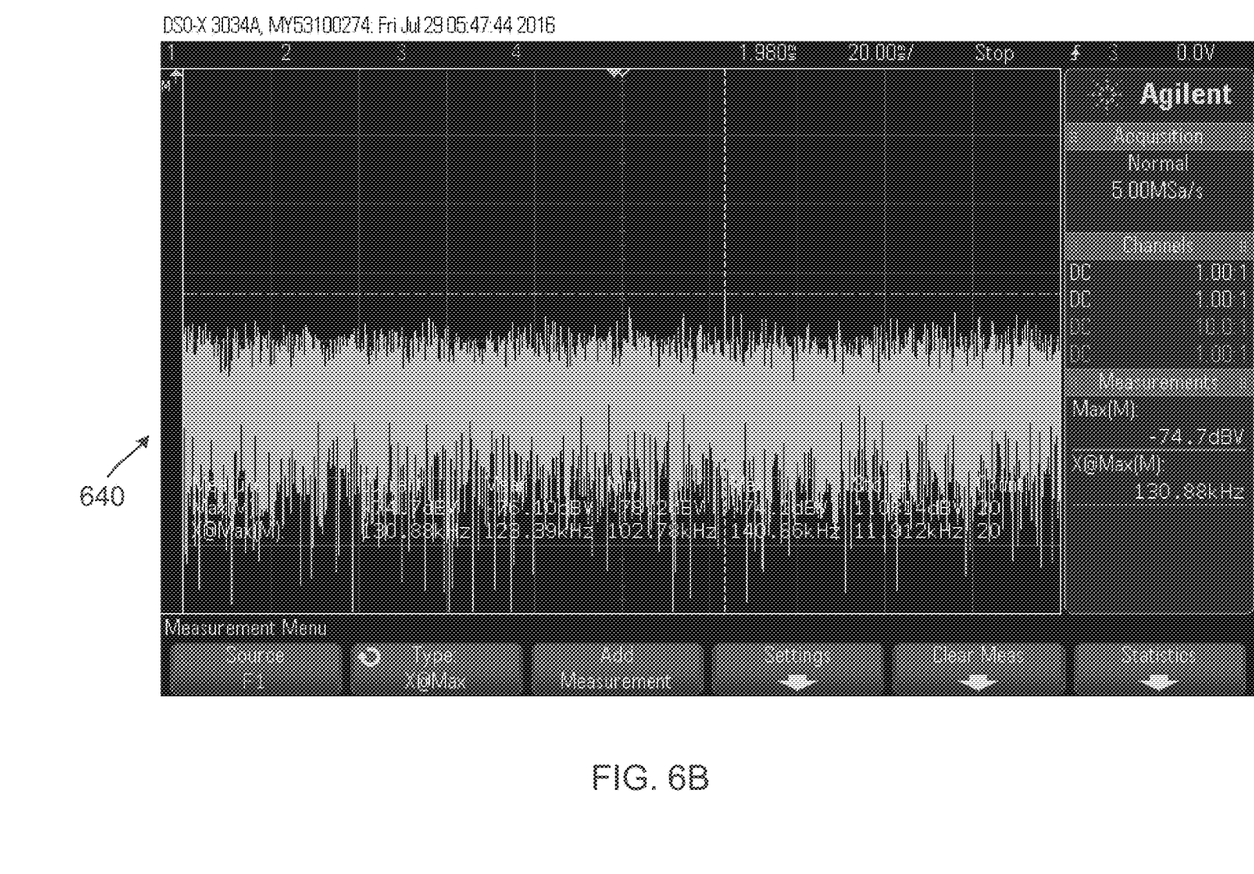

FIG. 6A provides a waveform of chassis noise relative to the signal ground 326 of the CTP controller 334 of FIG. 3A. As previously discussed, in FIG. 3A, the touch panel controller 334 is isolated from the display assembly 312 by way of the isolator 314. As a result, there is no path for the chassis noise to couple into the touch panel controller IC 206 while some chassis noise may be shunted to the first low voltage source 226 (e.g., a signal ground). Such chassis noise is illustrated in a waveform 620 of FIG. 6B. As illustrated in FIG. 6B, the magnitudes of the chassis noise are generally stable ranging from −53.0 dBV to −51.0 dBV with a mean of −52.20 dBV. As such, the magnitude of noise perceived by the display assembly is reduced compared to that in the waveform 600.

FIG. 6B provides a waveform of chassis noise relative to the signal ground 326 of the CTP controller 334 of FIG. 3B. As previously discussed, in FIG. 3C, the second low voltage source 326 (e.g., the isolated signal ground) is connected to the chassis ground 216. Accordingly, the BITO may become a stable reference for the sensor ITO thereby improving performance within the touch panel. This improvement in performance is illustrated in a waveform 640 in FIG. 6B. From FIG. 6B, the waveform 640 illustrates a stable magnitude of noise level ranging from −78.2 dBV to −74.2 dBV with a mean of −76.10 dBV. Such magnitude of noise level is lower than that in the waveform 620 thereby further improving performance within the touch panel.

Method and apparatus for a capacitive touch panel have been described in the foregoing paragraphs. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A display device comprising:
    a sensor glass configured to sense a touch and provide a touch input signal, the sensor glass including a glass substrate having a surface, and a first conductive layer disposed on the surface of the glass substrate;
    a touch panel controller including a touch panel integrated circuit (IC) coupled to the sensor glass and a first low voltage source, wherein the touch panel IC is configured to receive and process the touch input signal and provide touch data; and
    an isolator configured to couple the touch panel IC to the display assembly by connecting to the first low voltage source and a first high voltage source and connecting to a low voltage source of the display assembly and a second high voltage source, wherein the isolator electrically isolating the touch panel IC from the display assembly by eliminating a noise path for ground noise to pass through the touch panel IC.

2. The display device of claim 1, wherein the sensor glass further includes an opposite surface and a second conductive layer disposed on the opposite surface of the glass substrate.

3. The display device of claim 2, wherein the first conductive layer and second conductive layer include indium tin oxide (ITO).

4. The display device of claim 1, wherein the display assembly further includes an impedance coupled between a chassis ground and the first low voltage source.

5. The display device of claim 1, wherein the first low voltage source is coupled to a chassis ground.

6. A display device, comprising:
    a sensor glass configured to sense a touch and provide a touch input signal, the sensor glass including a glass substrate having a surface, and a first conductive layer disposed on the surface of the glass substrate;
    a touch panel controller including a touch panel integrated circuit (IC) coupled to the sensor glass and a first low voltage source, wherein the touch panel IC is configured to receive and process the touch input signal and provide touch data; and
    an isolator configured to couple the touch panel IC to the display assembly, with the isolator electrically isolating the touch panel IC from the display assembly; wherein the isolator includes a first coil having a first end coupled to the first low voltage source and a second end coupled to a high voltage source, and a second coil having a first end coupled to a second low voltage source and a second end coupled to the high voltage source.

7. The display device of claim 6, wherein the isolator further includes a third coil and a fourth coil, the third coil coupled to the touch panel IC and configured to inductively communicate the touch information to the fourth coil.

8. The display device of claim 6, wherein the isolator further includes a digital isolator coupled to the touch panel IC and configured to receive touch information from the touch panel IC and output corresponding information to another system.

9. A display device comprising:
    a sensor glass configured to sense a touch and provide a touch input signal, the sensor glass including a glass substrate having a surface, and a first conductive layer disposed on the surface of the glass substrate;
    a touch panel controller including a touch panel integrated circuit (IC) coupled to the sensor glass and a first low voltage source, wherein the touch panel IC is configured to receive and process the touch input signal and provide touch data;
    a display assembly; and
    an isolator configured to couple the touch panel IC to the display assembly, the isolator comprising a coil and at least one of an optoisolator and a digital isolator, with said at least of one of an optoisolator and a digital isolator configured to receive touch information from the touch panel IC and output corresponding information to another system.

10. The display device of claim 9, further comprising another coil, in which power is inductively transferred from one coil to another.

11. The display device of claim 9, further comprising an onboard capacitor connecting one end of a coil to another.

12. The display device of claim 9, further comprising an onboard capacitor connecting one end of the coil to a chassis ground of the display assembly.

13. The display device of claim 9, wherein the sensor glass comprises a glass substrate disposed between a first conductive layer and a second conductive layer.

14. The display device of claim 9, wherein a chassis noise source includes one or more of a media server system, computer system, transceiver system, one or more user interface systems, a content distribution system, and a power supply of the display assembly.

15. A method for a touch panel, comprising:
    receiving, by a touch panel controller, touch input from a sensor glass, the touch input indicative of an area on the sensor glass;
    processing the touch input and generating touch data based on the touch input; and
    one of inductively, optically, and digitally communicating the touch data to a system controller using an isolator, wherein the touch panel controller includes a touch panel integrated circuit (IC) coupled to a first low voltage source, and wherein the isolator is configured to galvanically isolate the touch panel controller from a display system by connecting to the first low voltage source and a first high voltage source and to a chassis ground of the display assembly and a second high voltage source, thereby removing a chassis noise path through the touch panel IC.

16. The method of claim 15, wherein the isolator includes a first coil configured to inductively communicate the touch data to a second coil.

17. The method of claim 15, wherein the sensor glass comprises a glass substrate disposed between a first conductive layer and a second conductive layer, with the first conductive layer and the second conductive layer forming a capacitive element.

18. The method of claim 17, wherein the first conductive layer and the second conductive layer include optoelectronic material.

19. The method of claim 18, wherein the touch panel integrated circuit (IC) is coupled to the first conductive layer.

20. A method for a touch panel, comprising:
receiving, by a touch panel controller, touch input from a sensor glass, the touch input indicative of an area on the sensor glass;
processing the touch input and generating touch data based on the touch input; and
one of inductively, optically, and digitally communicating the touch data to a system controller using an isolator, wherein the isolator is configured to galvanically isolate the touch panel controller from a display system, thereby removing a chassis noise path through a touch panel controller board; wherein the isolator includes a first coil configured to inductively communicate the touch data to a second coil and a third coil coupled to a first low voltage source and a fourth coil coupled to a second low voltage source.

* * * * *